US007366596B2

(12) United States Patent

Kawauchi et al.

(10) Patent No.: US 7,366,596 B2

(45) Date of Patent: Apr. 29, 2008

(54) TROUBLE DIAGNOSING DEVICE

(75) Inventors: Hiroshi Kawauchi, Tokyo (JP); Akihisa Kitajima, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 528 days.

(21) Appl. No.: 10/911,066

(22) Filed: Aug. 4, 2004

(65) Prior Publication Data

US 2005/0065679 A1 Mar. 24, 2005

(30) Foreign Application Priority Data

Aug. 8, 2003 (JP) ............................ 2003-290196

(51) Int. Cl.
*G06F 7/00* (2006.01)
*G06F 11/32* (2006.01)

(52) U.S. Cl. ......................... 701/29; 701/33; 702/183; 714/25

(58) Field of Classification Search ............ 701/29-36; 702/182-188; 714/100, 25
See application file for complete search history.

(56) References Cited

U.S. PATENT DOCUMENTS

| | | | | |
|---|---|---|---|---|
| 5,648,902 | A | 7/1997 | Honda | |
| 5,774,361 | A | 6/1998 | Colarelli, III et al. | |
| 5,909,379 | A | 6/1999 | Dale, Jr. et al. | |
| 5,968,108 | A | 10/1999 | Takakura et al. | |
| 6,141,608 | A | 10/2000 | Rother | |
| 6,181,992 | B1 | 1/2001 | Gurne et al. | |
| 6,327,525 | B1 | 12/2001 | Pauli et al. | |
| 6,370,455 | B1 | 4/2002 | Larson et al. | |
| 6,411,874 | B2 | 6/2002 | Morgan et al. | |
| 6,542,794 | B2 | 4/2003 | Obradovich | |
| 6,615,120 | B1 | 9/2003 | Rother | |
| 6,714,846 | B2 * | 3/2004 | Trsar et al. | 701/33 |
| 6,845,307 | B2 | 1/2005 | Rother | |
| 2001/0029410 | A1 | 10/2001 | Obradovich | |
| 2003/0187556 | A1 | 10/2003 | Suzuki | |
| 2005/0065680 | A1 | 3/2005 | Kawauchi et al. | |
| 2005/0137762 | A1 | 6/2005 | Rother | |

FOREIGN PATENT DOCUMENTS

| | | |
|---|---|---|
| DE | 197 12 924 A1 | 10/1997 |
| EP | 0 922 952 A1 | 6/1999 |
| JP | 02-110337 A | 4/1990 |

(Continued)

OTHER PUBLICATIONS

"Notification For Filing Opinion" for Korean Patent Application 10-2004-61873. Mailing date: Jan. 2, 2006.

(Continued)

*Primary Examiner*—Yonel Beaulieu
(74) *Attorney, Agent, or Firm*—Rossi, Kimms & McDowell, LLP

(57) ABSTRACT

A trouble diagnosing device connectable to an ECU mounted on a vehicle and equipped with a memory to store current trouble information and past trouble information, and the trouble diagnosing device includes a display screen to display a diagnosed trouble state, and a simultaneous display unit to call trouble information stored in the memory and make both of the current trouble information and past trouble information displayed at a same time on the display screen.

9 Claims, 5 Drawing Sheets

FOREIGN PATENT DOCUMENTS

| | | | |
|---|---|---|---|
| JP | 02-308951 | A | 12/1990 |
| JP | 04-304589 | A | 10/1992 |
| JP | 11-144042 | A | 5/1999 |
| JP | 2000-146766 | A | 5/2000 |
| JP | 2000-240495 | A | 9/2000 |
| JP | 2002-091545 | A | 3/2002 |
| JP | 2002-91545 | A | 3/2002 |
| KR | 2000-0028587 | A | 5/2000 |
| KR | 2000-0059333 | | 10/2000 |
| WO | WO 00/39556 | A1 | 7/2000 |

OTHER PUBLICATIONS

"Notification For Filing Opinion" for Korean Patent Application 10-2004-61897. Mailing date: Jan. 6, 2006.

Rupalla et al.; "Innovative Diagnostics Applications in the Vehicle"; Automotive Electronics; Nov. 2002; pp. 82-87.

German Office Action for German Patent Application 10 2004 038 348.0-52; mailing date, Oct. 12, 2005; English translation of Official Action dated Oct. 12, 2005.

German Office Action for related German Patent Application 10 2004 038 376.6-52; mailing date, Oct. 13, 2005; English translation of Official Action dated Oct. 13, 2005.

Relevant portion of Chinese Office Action in corresponding Chinese Application 200410056522.X.

Notification of reasons for Rejection issued in corresponding Japanese application No. 2003-290196, mailed Nov. 13, 2007.

* cited by examiner

TROUBLE DIAGNOSING DEVICE

CROSS-REFERENCE TO RELATED APPLICATIONS

This application is based upon and claims the benefit of priority from prior Japanese Patent Application No. 2003-290196, filed Aug. 8, 2003, the entire contents of which are incorporated herein by reference.

BACKGROUND OF THE INVENTION

1. Field of the Invention

The present invention relates to a trouble diagnosing device that diagnoses a trouble of a vehicle such as a track or a bus, as the device is coupled with an ECU (electronic control unit) mounted on the vehicle.

2. Description of the Related Art

As shown in FIG. 7, a trouble diagnosing device for an electronic control system of a vehicle is conventionally known. (See, for example, Jpn. Pat. Appln. KOKAI Publication No. 2002-91545.) As shown in FIG. 7, a trouble diagnosing device 1 is connected via a communication line 2 to a vehicle-installed ECU 3 (electronic control unit). Various commands are transmitted and received between the trouble diagnosing device 1 and the ECU 3 via the communication line 2. The ECU 3 has a diagnosis function. The diagnosis function means a self-diagnostic function. More specifically, the ECU 3 monitors input signals from various sensors, actuator and switch, and when some abnormality occurs in an input signal, the ECU 3 makes a memory 4 store the contents of the abnormality (diagnosis code). When a starter switch (not shown) is turned on to start the engine, thus generated diagnosis code is stored in a current trouble information region of the memory 4 as a current diagnosis code in real time. When the starter switch (not shown) is turned off, the diagnosis code stored in the current trouble information region of the memory 4 is transferred to a past trouble information region of the memory 4, where the transferred code is set as a past diagnosis code, and the current trouble information region is cleared to zero.

The trouble diagnosis device 1 includes a display unit 5, an "S" key 6*a*, a "C" key 6*b*, a cursor key 7, an "YES" key 8*a*, a "NO" key 8*b* and function keys 9.

The trouble diagnosing device 1 can display a diagnosis code generated while the vehicle is running, on a display unit 5.

For example, when a self-diagnostic mode is set by manipulating a particular key, the trouble diagnosing device 1 transmits to the ECU 3 a command instructing to read the current diagnosis codes stored in the current trouble information region of the memory 4. Consequently, the current diagnosis codes are displayed on the display unit 5 as shown in FIG. 8A. The display unit 5 displays a total of 5 diagnosis codes including "11. common rail pressure sensor". In the case where more than 5 diagnosis codes are actually stored in the current trouble information region of the memory 4, these codes must be scrolled on the screen by manipulating the cursor key 7. It should be noted that numeral "11" indicates a diagnosis code.

For maintenance, it is necessary to know the past diagnosis codes. To display the past codes, for example, the "S" key 6*a* was assigned for this operation. As the "S" key 6*a* is operated, the trouble diagnosing device 1 transmits to the ECU 3 a command of reading out the past diagnosis codes stored in the past trouble information region of the memory 4 of the ECU 3. Consequently, the past diagnosis codes are displayed on the display unit 5.

As described above, in order to display past diagnosis codes on the display unit 5, the key operation described above must be performed, but this operation is laborious and therefore it makes the maintenance work more complicated.

Further, for the repair of a broken-down vehicle, not only current diagnosis codes but also past diagnosis codes are important data. Nevertheless, if one mechanic takes a memo of the information of the diagnosis codes displayed on the display unit 5, and passes it to another mechanic, there results in some cases such confusion that it is not clear as to whether a diagnosis code on the memo indicates a current diagnosis code or a past diagnosis code. When such confusion occurs, it is very difficult to investigate the cause for the trouble.

BRIEF SUMMARY OF THE INVENTION

The present invention has been proposed in consideration of the above-described points, and the object thereof is to provide a trouble diagnosing device with an improved ease of maintenance and repair using diagnosis codes stored in an electronic control device equipped with a diagnostic function and capable of easily investigating the cause for a trouble.

According to an aspect of the present invention, there is provided a trouble diagnosing device connectable to an electronic control unit mounted on a vehicle and equipped with a trouble storing unit configured to store current trouble information and past trouble information, the trouble diagnosing device comprising: a display screen configured to display a diagnosed trouble state; and a simultaneous display unit configured to call trouble information stored in the trouble storing unit and make both of the current trouble information and past trouble information at a same time on the display screen.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
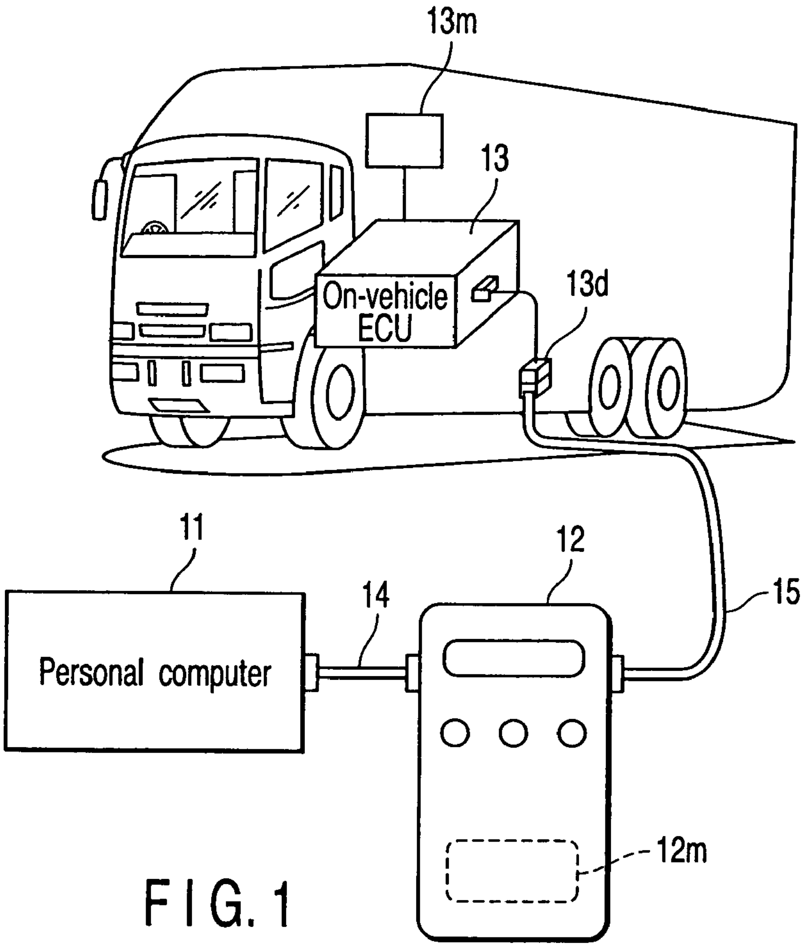
FIG. 1 is a diagram illustrating connection between a trouble diagnosing device and an ECU according to an embodiment of the present invention.

An embodiment of the present invention will now be described with reference to accompanying drawings. FIG. 1 is a diagram illustrating connection between the trouble diagnosing device according to this embodiment and an ECU mounted to the vehicle and designed to control the air suspension. This figure also shows a personal computer (to be abbreviated as PC hereinafter) 11 that constitutes the trouble diagnosing device. The PC 11 is connected to the ECU 13 mounted on the vehicle and serving as an electronic control device, via a VCI (vehicle communication interface) 12 serving as an interface equipment and constituting the trouble diagnosing device. The ECU 13 includes an ECU for engine control, an ECU for air suspension, etc. The PC 11 and VC 112 are connected to each other via a multiple communication line 14, and the VCI 12 and ECU 13 are connected to each other via a multiple communication line 15. An end of the multiple communication line 15 is coupled to a diagnosis connector 13*d* of the ECU 13.

The VCI 12 has a function of converting a communication specification used for the ECU 13 into a communication specification used for the PC 11. The VCI 12 has a built-in microprocessor and has a memory 12*m* inside.

As described above, the trouble diagnosing device itself is pre-equipped with the interface equipment serving as an interface with the electronic control unit mounted on the vehicle. Thus, it is not necessary to particularly prepare a separate interface equipment. Therefore, the operation for matching the specifications with each other can be omitted and therefore the increase in production cost can be suppressed.

The ECU 13 has a diagnostic function. The diagnostic function means a self-diagnostic function. That is, the ECU 13 monitors input signals from various types of sensors, an actuator and switch, and when some abnormality occurs in anyone of the input signals, the ECU 3 stores the contents of the abnormality (diagnosis code) or the data at the time the abnormality occurred in the memory 13*m* as maintenance and repair data.

Figure 3A:
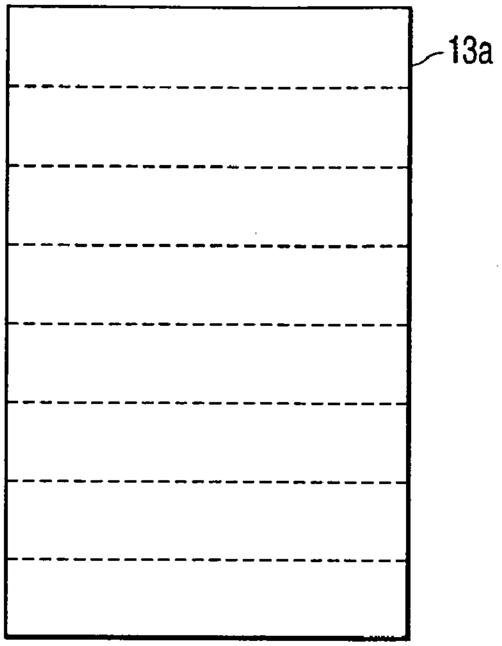
FIGS. 3A and 3B are diagrams each showing a structure of the trouble storing unit.
Figure 3B:
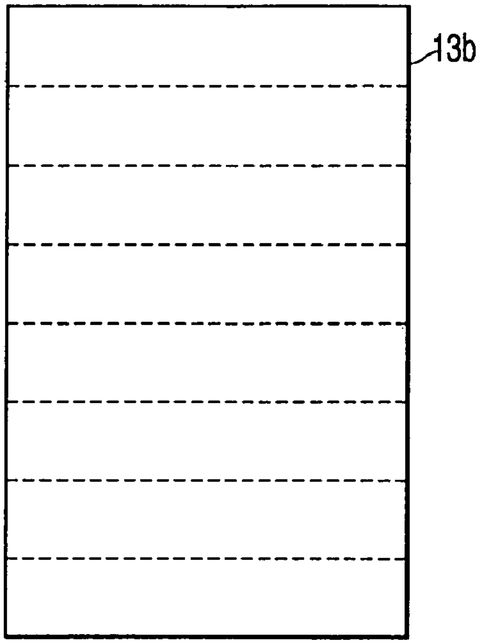

A predetermined area of the memory 13*m* further includes a current trouble information region 13*a* for storing current diagnosis codes, as shown in FIG. 3A and a past trouble information region 13*b* for storing past diagnosis codes, as shown in FIG. 3B. In each of the current trouble information region 13*a* and the past trouble information region 13*b*, for example, eight diagnosis codes can be stored at the maximum. When a starter switch (not shown) is turned on to start the engine, diagnosis codes generated are stored one after another into the current trouble information region 13*a* as current diagnosis codes in real time. When the starter switch (not shown) is turned off, the diagnosis codes stored in the current trouble information region 13*a* are transferred to the past trouble information region 13*b* of the memory 13*m*, where the transferred codes are stored as past diagnosis code. After that, the current trouble information region 13*a* is cleared to zero.

As described above, the current trouble information region 13*a* is capable of storing eight current diagnosis codes at the maximum. For example, in the case where three current diagnosis codes are already stored in the current trouble information region 13*a*, and additional diagnosis codes that are the same as any of these three already stored codes are generated, the three already stored diagnosis codes are maintained as they are.

In the case where eight current diagnosis codes are already stored in the current trouble information region 13*a*, and a new current diagnosis code is generated, the oldest one of the already stored eight current diagnosis codes is deleted, and then the new current diagnosis code is stored in the current trouble information region 13*a*.

Figure 2:
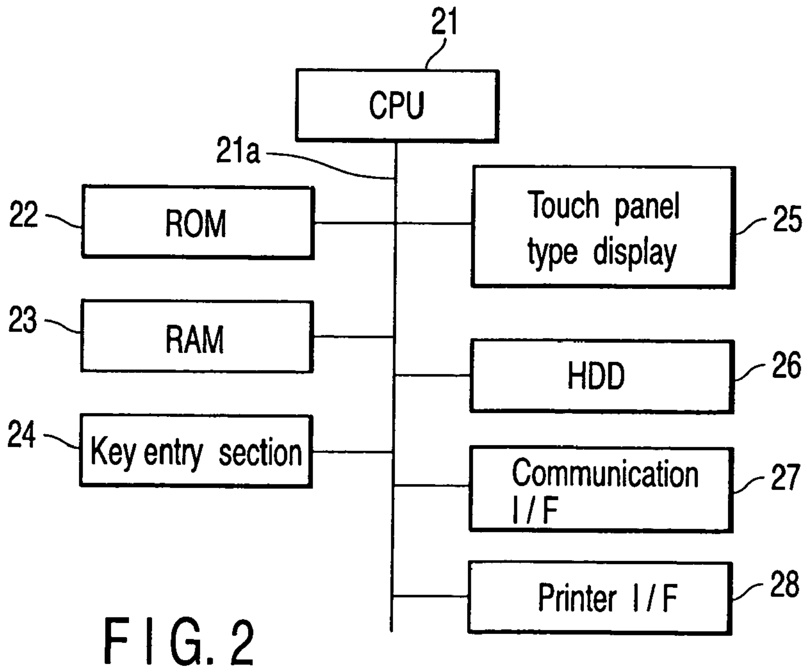
FIG. 2 is a diagram showing a system structure of a personal computer that constitutes the trouble diagnosing device according to the same embodiment.

Next, the structure of the PC 11 will now be described with reference to FIG. 2. FIG. 2 shows a CPU (central processing unit) 21. To the CPU 21, a ROM (read-only memory) 22, a RAM (random access memory) 23, a key entry portion 24, a touch-panel type display 25 having a rectangular display screen, an HDD (hard disk device) 26, a communication I/F 27 and a printer I/F 28 are connected via a system bus 21*a*.

The HDD 26 stores a trouble diagnostic program for executing the diagnostic functions.

Figure 4:
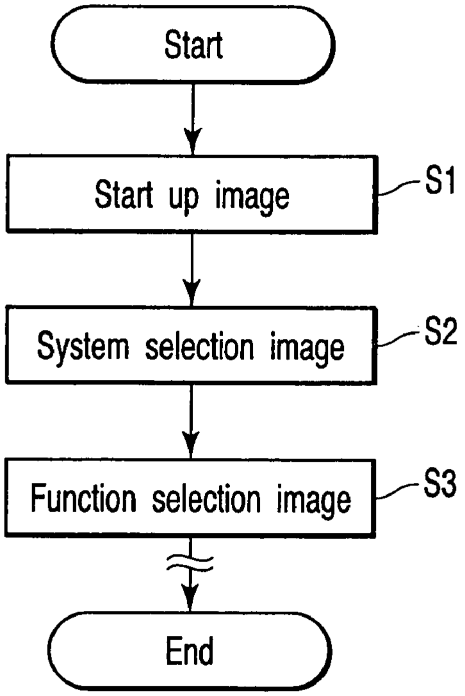
FIG. 4 is a flowchart briefly illustrating the operation of the trouble diagnosing device according to the same embodiment.

The trouble diagnostic program includes the following programs:

(1) A main program as illustrated in FIG. 4; and (2) A program for displaying an image corresponding to a touch button displayed on the display 25 when an operator touches the button, and a program for executing a process designated by the button.

The details of these programs are as follows. For example, one of these corresponds to simultaneous display unit for displaying current diagnosis codes, past diagnosis codes, and a total number of each type of codes simultaneously on the display screen 31. These data are displayed as a command for reading the current diagnosis codes and past diagnosis codes stored in the current trouble information region 13*a* and past trouble information region 13*b*, respectively, a command for reading the total number of the current diagnosis codes and past diagnosis codes, etc., are output to the ECU 13 with the touch of a “self-diagnosis” button of the function menu, which will be described later. Another program corresponds to a trouble information erasing unit for instructing the ECU 13 to erase certain diagnosis codes of at least one type of the current diagnosis codes and past diagnosis codes stored in the current trouble information region 13*a* and past trouble information region 13*b*, respectively, with the touch of an “eraser” button 43. Still another program corresponds to a printing unit for printing a presently displayed image by transmitting the data corresponding to an image presently shown on the display screen 31 to a printer (not shown) via the printer I/F 28. Still another program corresponds to a dialog-type trouble diagnosing unit for performing a dialog-type troubleshooting with the touch of a “code-by-code troubleshooting” button 42.

It should be noted here that the RAM 23 has various work areas.

Next, the operation will now be described. The members are connected to each other as shown in FIG. 1. Then, the PC 11 is turned on to start up the trouble diagnosing program, and then the starter switch (not shown) of the truck is turned on, the trouble diagnosis illustrated by the flowchart shown in FIG. 4 is started.

Figure 5:
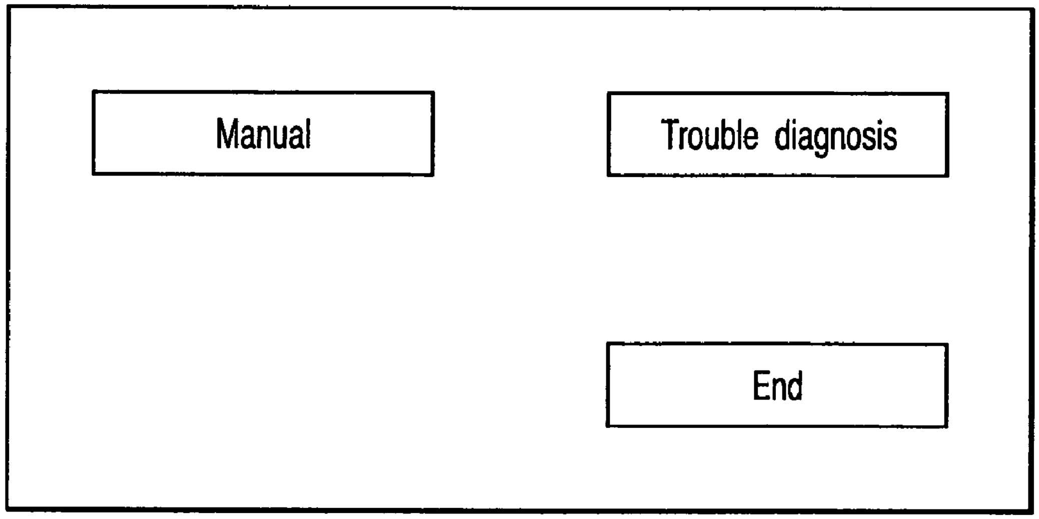
FIG. 5 is a diagram showing a startup screen of the trouble diagnosing device according to the same embodiment.

First, a startup image as shown in FIG. 5 is displayed as the main menu on the display 25 (Step S1). Next, when the “trouble diagnosis” button is selected, then a system selection image is displayed on the display 25, in which one of the three systems, namely, engine, chassis and body can be selected (Step S2). Next, when the chassis is selected from this image and then the air suspension is selected, the function selection image is displayed (Step S3).

This function selection image presents buttons for the "self-diagnosis", . . . , "calibration", . . . .

Figure 6:
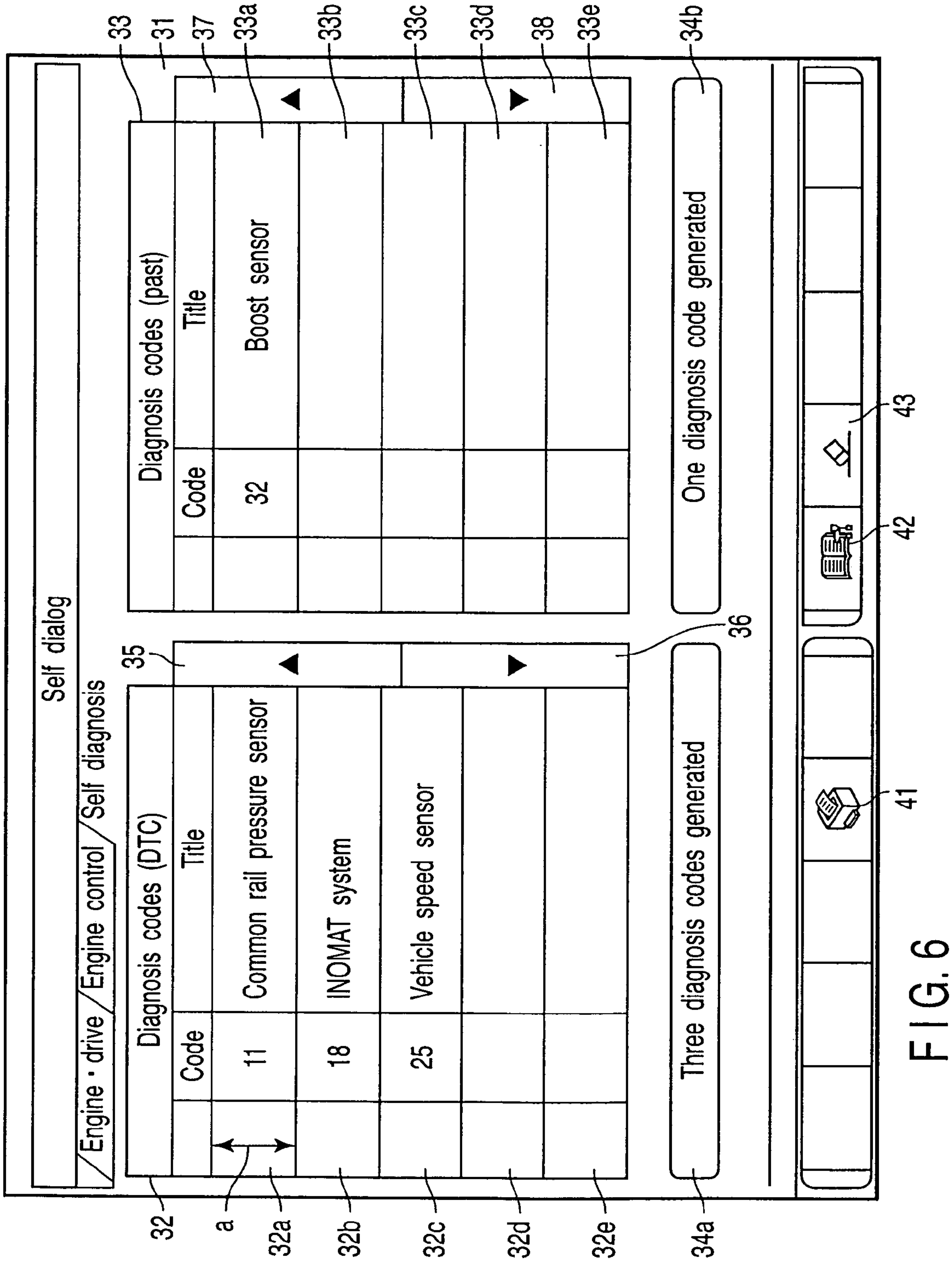
FIG. 6 is a diagram showing a self-diagnosis screen of the trouble diagnosing device according to the same embodiment.
Figure 7:
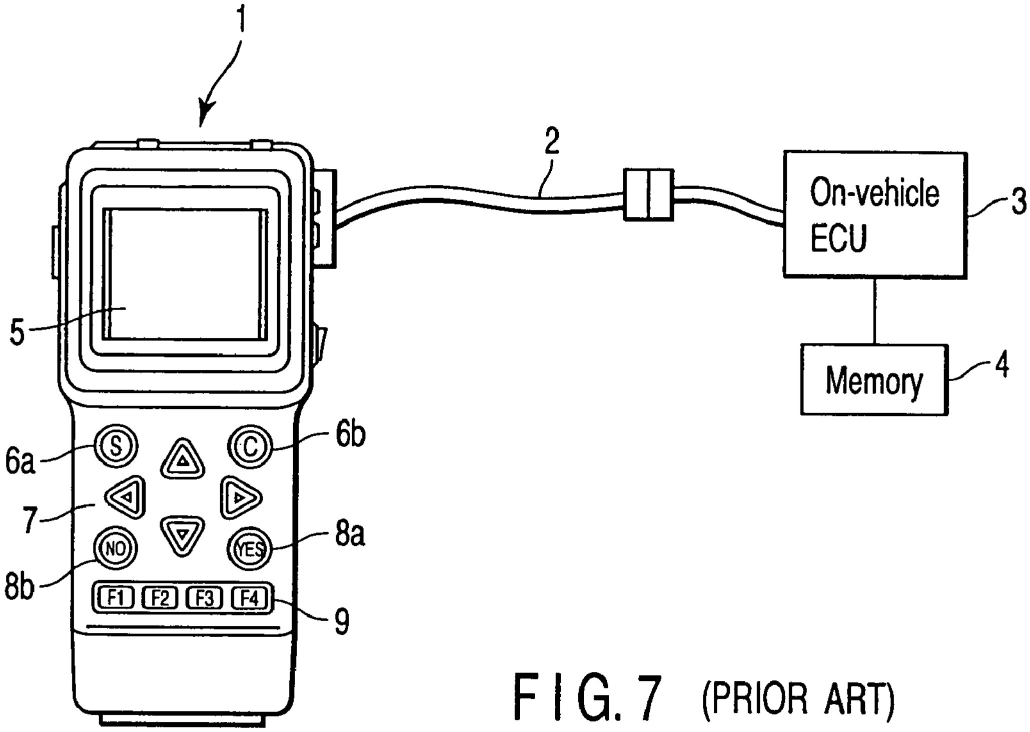
FIG. 7 (PRIOR ART)
FIG. 7 is a diagram illustrating a trouble diagnosing device according to a conventional technique.
Figure 8A:
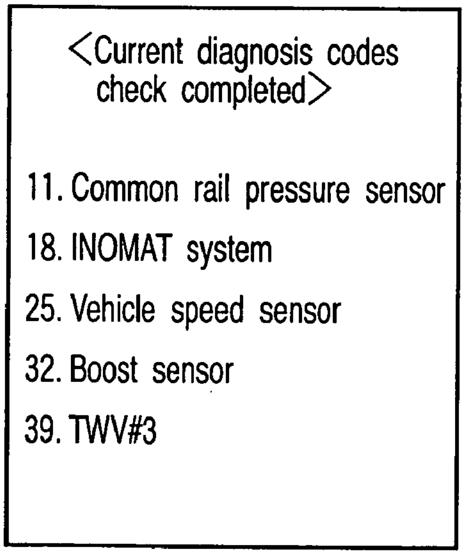
FIG. 8A (PRIOR ART)
FIGS. 8A and 8B are diagrams each showing a display screen of the trouble storing unit according to the conventional technique.
Figure 8B:
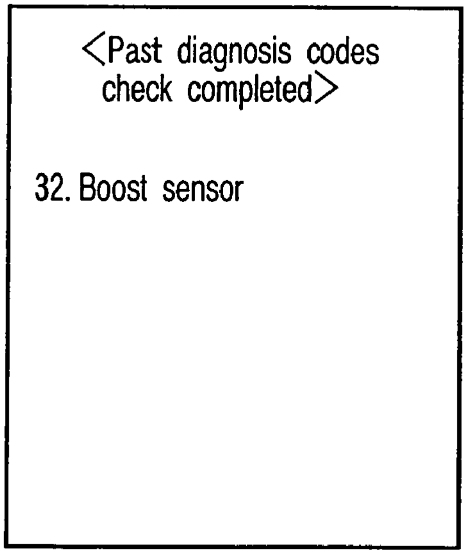
FIG. 8B (PRIOR ART)

When the "self-diagnosis" is selected from this image, what is shown in FIG. 6 as a display screen 31 is displayed on the display 25. In other words, when the "self diagnosis" button on the function display image is manipulated, the simultaneous display unit of the PC 11 transmits the command for reading the current diagnosis codes and past diagnosis codes stored in the current trouble information region 13*a* and past trouble information region 13*b*, respectively, via the VCI 12 to the ECU 13. The ECU 13, when receiving this command, reads out the current diagnosis codes and past diagnosis codes stored in the current trouble information region 13*a* and past trouble information region 13*b*, respectively, and transmit them to the PC 11. The PC 11, when receiving these codes, counts the total number of the current diagnosis codes and past diagnosis codes transmitted.

The display screen 31 illustrated in FIG. 6 shows an example where three current diagnosis codes and one past diagnosis code are displayed.

On the left-hand side of the display screen 31, a current trouble information display section 32 which is capable of five displaying current diagnosis codes at the maximum is provided, whereas a past trouble information display section 33 which is capable of five displaying past diagnosis codes at the maximum is provided.

More specifically, the current trouble information display section 32 is provided with five independent cells 32*a* to 32*e* in which trouble information are indicated, and similarly, the past trouble information display section 33 is provided with five independent cells 33*a* to 33*e*. A width a of each of the cells 32*a* to 32*e* and cells 33*a* to 33*e* is about 0.39 inch (=1 cm) to 0.79 inch (=2 cm) when the display screen has a size of 12.1 inches.

As described above, when the display screen has a size of 12.1 inches (the length of a diagonal line of the screen image is about 31 cm), each of the cells 32*a* to 32*e* is displayed to have such a large width of about 0.39 inch (=1 cm) to 0.79 inch (=2 cm). With this size, if each cell of the trouble diagnosing device is manipulated by an operator in a maintenance and repair shop with work gloves on, the possibility of the operating error can be significantly reduced.

In the case where the display screen 31 has a size of 15 inches, it is preferable that the width of each of the cells 32*a* to 32*e* should be set to about 0.49 inch (=1.24 cm) to 0.98 inch (=2.48 cm).

In the case where the display screen 31 has a size of 17 inches, it is preferable that the width of each of the cells 32*a* to 32*e* should be set to about 0.56 inch (=1.41 cm) to 1.11 inches (=2.82 cm). Thus, the width of each cell should preferably be set to about 1/30 to 1/15 of the length of a diagonal line of the screen image.

DCT indicated at the top section of the current trouble information display section 32 is the abbreviation of diagnosis trouble code, which means current diagnosis node.

The contents shown in FIG. 6 as the display screen 31 show an example in which the current trouble information display section 32 shows "11" as a current diagnosis code, "common rail pressure sensor" as the broken down part indicated by the code, "18" as another current diagnosis code, "INOMAT system" as the broken down part indicated by the code, "25" as still another current diagnosis code, "vehicle speed sensor" as the broken down part indicated by the code. Further, the past trouble information display section 33 shows "32"as a past diagnosis code, and "boost sensor" as the broken down part indicated by the code.

As described above, when the "self diagnosis" button of the function display image is manipulated, current diagnosis codes and past diagnosis codes are indicated in the current trouble information display section 32 and the past trouble information display section 33, respectively, at the same time on the display screen 31 so that they can be compared and contrasted with each other. In this manner, troubles that occurred in the past and those occurred this time can be easily compared with each other. Thus, it is possible to recognize the past troubles and current troubles at a glance without switching the images during the repair. Therefore, the ease of repair can be improved.

Further, the current trouble information display section 32 includes in its lower portion a total trouble count indicating section 34*a* that indicates the total number of current diagnosis codes. Similarly, the past trouble information display section 33 includes in its lower portion a total trouble count indicating section 34*b* that indicates the total number of past diagnosis codes. The total number of current diagnosis codes indicated in the total trouble count indicating section 34*a* and the total number of past diagnosis codes indicated in the total trouble count indicating section 34*b* can be obtained by counting, on the PC 11 side, the number of current diagnosis codes and the number of past diagnosis codes, respectively, which have been transmitted from the ECU 13.

According to the embodiment, the total number of each group of the present and past diagnosis codes is indicated, and therefore it is possible to know whether there are more data present that cannot be displayed in the current trouble information display section 32 and past trouble information display section 33. Thus, it is very hard to miss even those diagnosis codes that are not displayed in the image screen.

Further, the total number of each of the current and past diagnosis codes is displayed, and therefore it is possible to know how serious is a trouble at a glance, and to know the frequency of troubles of the ECU 13.

For example, in the example shown in the figure, three current diagnosis codes are indicated in the current trouble information display section 32, and the count indicated in the total trouble count indicating section 34*a* is "3". Therefore, in this case, it is possible to understand that all of the current diagnosis codes are presently indicated in the current trouble information display section 32.

Suppose here the case where five current diagnosis codes are indicated in the current trouble information display section 32 and the count indicated in the total trouble count indicating section 34*a* is "8". In this case, three current diagnosis codes remain not displayed. In order to display these three remaining current diagnosis codes on the current trouble information display section 32, the data can be scrolled on the screen by appropriately manipulating the cursor buttons 35 and 36 provided on the right-hand side of the current trouble information display section 32.

Cursor buttons 37 and 38 designed to scroll displayed data are displayed on the right-hand side of the past trouble information display section 33.

Thus, with the total number of each group of the current and past diagnosis codes displayed, it is possible to know how serious is a trouble at a glance, and to know the frequency of troubles of the ECU 13 as a whole.

Further, the section of the menu bar provided in the lowermost section of the display screen 31 displays the display button 41 for printing the contents presently shown on the display screen 31, the "code-by-code troubleshooting" button 42 for performing a dialog-type troubleshooting, and the "eraser" button 43 for erasing certain diagnosis codes of at least one group of the current diagnosis codes and past diagnosis codes stored in the current trouble information display section 32 and past trouble information display section 33, respectively.

For example, when the printing button 41 is manipulated by touching it, the contents of the current display screen 31 are printed and output from a printer (not shown) connected the printer I/F 28.

Thus, the current diagnosis codes and past diagnosis codes are printed at the same time on the same sheet, the record of maintenance and repair can be easily and accurately formed. Further, for printing, it suffices only if the printing button 41 is touched, and thus the printing order can be easily made. Furthermore, by having the current trouble data and past trouble data on a print, the data can be accurately passed on to another mechanic who next takes case of the vehicle, thereby making it possible to improve the efficiency of the maintenance and repair.

Moreover, when one of the cells 32*a* to 32*e* in which current diagnosis codes or past diagnosis codes are displayed is selected by touching it, and then the "code-by-code troubleshooting" button 42 is touched, the dialog-type trouble diagnosis corresponding to the selected diagnosis code is started. In other words, under what conditions the selected diagnosis code occurred is indicated on the displayed image 31, and the maintenance and repair data stored in the memory 13*m* of the ECU 13 are displayed. Thus, with these displayed data, the inspection procedure can be carried out in a dialog manner.

As described above, an operator can easily take care of the trouble without referring to the maintenance and repair guidebook.

On the other hand, when at least one of the current trouble information display section 32 and past trouble information display section 33 is selected by touching it, and then the "eraser" button 43 is touched, the data of the selected one of the current diagnosis codes and past diagnosis codes are erased from the memory 13*m*.

In this manner, for example, when the cause for a trouble is investigated and the troubled part is repaired in a maintenance and repair shop, the current diagnosis codes and past diagnosis codes can then be erased to start a new self-diagnosis.

In case where a vehicle with a trouble is brought in a maintenance and repair shop, but the trouble is not detected as current trouble information, such a conduct that easily causes a trouble as shaking a part to be inspected is performed. If trouble information corresponding to the inspected part is detected as current trouble information after this conduct, it can be judged that the inspected part is broken. Thus, it is possible to carry out the investigation of the cause for a trouble.

It should be noted here that it is alternatively possible to print out those current diagnosis codes and past diagnosis codes that are not displayed in the display screen 31 when the printing button 41 is touched, as well if there are any.

In the above-described embodiment, the total number of each group of the current diagnosis codes and past diagnosis codes transmitted from the ECU 13 is counted on the PC 11 side; however it is alternatively possible to count the total number on the ECU 13 side, and transmit it to the PC 11.

The renewal manner of the current diagnosis codes stored in the current trouble information region 13*a* of the memory 13*m* and the past diagnosis codes stored in the past trouble information region 13*b*, which was described with reference to FIGS. 3A and 3B is not limited to that of this embodiment, but it can be modified into various versions.

It should be noted that in the above-described embodiment, the programs that correspond to various units are stored in the HDD 26; however the present invention is not limited to this, but it is alternatively possible to store these programs in an external storage means such as a CD-ROM or FD, and download them to the HDD 26 of the PC 11 as needed.

Further, in the above-described embodiment, a touch panel-type display is used; however in the case of a PC that does not equipped with a touch panel-type display, each operation can be assigned with use of a mouse.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A trouble diagnosing device connectable to an electronic control unit mounted on a vehicle and equipped with a trouble storing unit configured to store current trouble information and past trouble information, the trouble diagnosing device comprising:

a display screen configured to display a diagnosed trouble state, the display screen including a current trouble information display section and a past trouble information display section; and a simultaneous display unit configured to call trouble information stored in the trouble storing unit and make both of the current trouble information and past trouble information displayed at a same time on the current trouble information display section and the past trouble information display section of the display screen, wherein the simultaneous display unit displays at the same time the current and past trouble information including the same trouble information and the current and past trouble information display sections, respectively.

2. The trouble diagnosing device according to claim 1, wherein the display screen includes trouble count display sections further indicating total numbers of the current and past trouble information when the current trouble information and past trouble information are displayed at the same time on the display screen.

3. The trouble diagnosing device according to claim 1, further comprising:

a trouble information erasing unit configured to instruct erasing of certain trouble information of at least one group of the current trouble information or the past trouble information stored in the trouble storage unit while the current trouble information and past trouble information are being displayed on the display screen.

4. The trouble diagnosing device according to claim 1, wherein the trouble diagnosing device is a computer terminal with an interface equipment for interfacing with the electronic control device.

5. The trouble diagnosing device according to claim 1, wherein the display screen is of a touch panel-type, and a plurality of trouble information displayed on the display screen are placed respectively in independent cells, each cell having a width of about 1/30 to 1/15 of a length of a diagonal line of the display screen.

6. The trouble diagnosing device according to claim 1, wherein the display screen is of a touch panel-type, and a plurality of trouble information displayed on the display screen are placed respectively in independent cells, each cell having a width of about 0.39 inch to 0.79 inch when the display screen has a size of 12.1 inches, about 0.49 inch to 0.98 inch when the display screen has a size of 15 inches, and about 0.56 inch to 1.11 inches when the display screen has a size of 17 inches.

7. The trouble diagnosing device according to claim 1, wherein the display screen is of a touch panel-type, and the display screen further displays a print instruction section, and the trouble diagnosing device further comprises a printing unit configured to print out present contents displayed on the display screen when the print instruction section on the screen is touched.

8. The trouble diagnosing device according to claim 1, wherein the current and past trouble information comprise diagnostic codes.

9. A trouble diagnosing device connectable to an electronic control unit mounted on a vehicle, the trouble diagnosing device comprising:

a trouble storing unit for storing current trouble information and past trouble information;

a display screen for displaying a diagnosed trouble state;

a simultaneous display unit for displaying both the current trouble information and the past trouble information at a same time on the display screen; and a trouble information erasing unit for instructing erasing of certain trouble information of at least one group of the current trouble information or the past trouble information stored in the trouble storage unit while the current trouble information and past trouble information are being displayed on the display screen.

* * * * *